(12) United States Patent
Adams et al.

(10) Patent No.: US 12,116,490 B2
(45) Date of Patent: Oct. 15, 2024

(54) LOW MIGRATION EB CURABLE INKS WITH BIO-RENEWABLE CONTENT

(71) Applicant: SUN CHEMICAL CORPORATION, Parsippany, NJ (US)

(72) Inventors: Joerg Adams, Karlstein am Main (DE); Kai-Uwe Gaudl, Karlstein am Main (DE); Matthias Hellblau, Karlstein am Main (DE)

(73) Assignee: Sun Chemical Corporation, Parsippany, NJ (US)

( * ) Notice: Subject to any disclaimer, the term of this patent is extended or adjusted under 35 U.S.C. 154(b) by 35 days.

(21) Appl. No.: 18/025,013

(22) PCT Filed: Apr. 8, 2022

(86) PCT No.: PCT/EP2022/059430
§ 371 (c)(1),
(2) Date: Mar. 7, 2023

(87) PCT Pub. No.: WO2022/214658
PCT Pub. Date: Oct. 13, 2022

(65) Prior Publication Data
US 2023/0242778 A1 Aug. 3, 2023

Related U.S. Application Data

(60) Provisional application No. 63/172,267, filed on Apr. 8, 2021.

(51) Int. Cl.
| | | |
|---|---|---|
| *C09D 11/101* | (2014.01) | |
| *C09D 11/037* | (2014.01) | |
| *C09D 11/06* | (2006.01) | |
| *C09D 11/104* | (2014.01) | |
| *C09D 167/02* | (2006.01) | |
| *C09D 175/04* | (2006.01) | |

(52) U.S. Cl.
CPC .......... *C09D 11/101* (2013.01); *C09D 11/037* (2013.01); *C09D 11/06* (2013.01); *C09D 11/104* (2013.01); *C09D 167/02* (2013.01); *C09D 175/04* (2013.01)

(58) Field of Classification Search
CPC ..... C09D 11/101; C09D 11/037; C09D 11/06; C09D 11/104; C09D 167/02; C09D 175/04
See application file for complete search history.

(56) References Cited

U.S. PATENT DOCUMENTS

| | | | | |
|---|---|---|---|---|
| 3,317,331 A | * | 5/1967 | Maigrot | C09B 39/00 |
| | | | | 106/494 |
| 2006/0079607 A1 | * | 4/2006 | Balmer | C09D 11/101 |
| | | | | 523/300 |
| 2011/0139022 A1 | * | 6/2011 | Brunner | C09D 11/101 |
| | | | | 522/170 |
| 2011/0143133 A1 | | 6/2011 | Bois et al. | |
| 2019/0023916 A1 | * | 1/2019 | Gaudl | C09D 193/04 |
| 2021/0087413 A1 | * | 3/2021 | Adams | B32B 27/08 |
| 2022/0056286 A1 | * | 2/2022 | Hishinuma | C08F 2/44 |

FOREIGN PATENT DOCUMENTS

| | | | | | |
|---|---|---|---|---|---|
| CN | 111334169 A | * | 6/2020 | | |
| CN | 111718643 A | * | 9/2020 | | |
| EP | 2 361 760 A1 | | 8/2011 | | |
| EP | 2 361 958 A1 | | 8/2011 | | |
| GB | 2569072 B | * | 11/2022 | .......... | B41M 5/0011 |
| JP | 2008195768 A | * | 8/2008 | | |
| JP | 2013185078 A | * | 9/2013 | | |
| JP | 2021155645 A | * | 10/2021 | | |
| KR | 20180006309 A | * | 1/2018 | | |
| WO | WO 2009/007296 A1 | | 1/2009 | | |
| WO | WO2017/182638 A1 | | 10/2017 | | |
| WO | WO 2020/212488 A1 | | 10/2020 | | |
| WO | WO-2022128462 A1 | * | 6/2022 | | |

OTHER PUBLICATIONS

"Ethoxylated Pentaerythritol Tetraacrylate." GuideChem, www.guidechem.com/encyclopedia/poly-oxy-1-2-ethanediyl-alpha--dic496655.html. Accessed Jun. 6, 2023. (Year: 2023).*
English Machine Translation of JP2013185078A ("Machine_Translation_Mine_JP_2013185078_A") (Year: 2013).*
English Machine Translation of JP2021155645A ("Machine_Translation_Okada_JP_2021155645_A") (Year: 2021).*
Annexe 10 de l'ordonnance du DFI sur les matériaux et objets destinés à entrer en contact avec les denrées alimentaires, May 1, 2017. https://www.blv.admin.ch/blv/fr/home/lebensmittel-und-ernaehrung/rechts-und-vollzugsgrundlagen/hilfsmittel-und-vollzugsgrundlagen/archiv-lebensmittelrecht.html (Year: 2017).*
English machine translation of JP-2008195768-A (Year: 2008).*
English machine translation of CN-111334169-A (Year: 2020).*
English machine translation of CN-111718643-A (Year: 2020).*

(Continued)

*Primary Examiner* — Jennifer A Smith
*Assistant Examiner* — Jeffrey Eugene Barzach
(74) *Attorney, Agent, or Firm* — Marian E. Fundytus; Ostrolenk Faber LLP.

(57) ABSTRACT

An electron-beam curable ink or coating for sensitive applications such as food packaging and pharmaceutical packaging. The ink or coating of the invention comprises a high bio-renewable content. A printed article or laminate comprising a cured layer derived from the ink or coating of the invention.

35 Claims, No Drawings

(56) References Cited

OTHER PUBLICATIONS

English machine translation of KR-20180006309-A (Year: 2018).*
International Search Report issued in International Application No. PCT/E P2022/059430, mailed Aug. 8, 2022.
Written Opinion of the International Searching Authority issued in International Application No. PCT/E P2022/059430, mailed Aug. 8, 2022.
International Preliminary Report on Patentability (Chapter 1 of the Patent Cooperation Treaty) issued in International Application No. No. PCT/E P2022/059430, mailed Feb. 20, 2023.
Seto, J. et al. "Electron beam curing of acrylic oligomers", Radiation Physics and Chemistry (1977) vol. 25, Issues 4-6, 1985, pp. 567-579].
CN 111334169A published Jun. 26, 2020, English language machine translation.

* cited by examiner

LOW MIGRATION EB CURABLE INKS WITH BIO-RENEWABLE CONTENT

CROSS REFERENCE TO RELATED APPLICATIONS

The present application is a § 371 National Phase application based on PCT/EP2022/059430 filed Apr. 8, 2022, which claims the benefit of U.S. Provisional Application No. 63/172,267, filed Apr. 8, 2021, the subject matter of each of which is incorporated by reference in their entirety.

FIELD OF THE INVENTION

The present invention relates to inks or coatings that provide cured layers comprising low amounts of migratable species and, as such, are particularly suitable for use in sensitive applications, such as packaging articles for foodstuffs.

BACKGROUND OF THE INVENTION

Electron beam (EB) curing (drying) is especially advantageous for energy-curable inks and coatings used in sensitive packaging applications, such as, for example food-packaging and pharmaceuticals. This is because higher conversion of double-bonds (i.e. increased monomer conversion) is achieved using EB curing relative to UV-curing, providing cured materials with lower levels of residual migratable monomers, which can be problematic for sensitive applications. Unlike UV curing, EB curing methods do not require any photoinitiators, which eliminates another potential source of migratable species and makes this technology especially suited for sensitive applications, such as food and pharmaceutical packaging.

Although inks for use in EB curing methods are free of photoinitiators, residual (meth)acrylate monomers can still be present in the cured inks, even including those having a high monomer conversion of the (meth)acylate groups. This can occur, for example, due to the increasing glass transition temperature ($T_g$) of an acrylated composition. In particular, as the propagating polymer chain increases in length, the Tg of the polymer increases until such time that it exceeds the curing temperature. At this point, the polymerisable mixture comprises a polymer at a temperature below its $T_g$, which, as a result of the reduction in polymer chain flexibility, will be less able to add additional monomer units and undergo further chain propagation [see, Electron beam curing of acrylic oligomers, *Radiation Physics and Chemistry* (1977) Volume 25, Issues 4-6, 1985, Pages 567-579]. Consequently, the curing reaction slows down, monomer conversion (of the acrylic double-bonds) is slowed, leaving residual unreacted monomers in the cured composition. It is acknowledged in the art that this process, along with other steric and thermodynamic restraints, inhibits monomer conversion (e.g. of the acrylate groups) when curing an energy curable ink, such that monomer conversion is almost never 100%.

Residual (meth)acrylate monomers are small and are thus able to migrate through the cured substrate, such that they risk contaminating articles with which they come into contact. For example, if a non-barrier food-packaging design is selected, the migratable species can come into contact with foodstuffs. Inks and coatings for use in such applications are therefore tested in order to detect the residual monomeric species, which can be detected using migration analysis.

To address the problem of contamination, printing inks and laminates should be provided that have a low amount of migratable species and that comply with specific migration limits (SML) as outlined by authorities, including the European Commission (in its Regulation No. 10/2011) and the Swiss Regulation on Food Contact Materials. Moreover, such inks must also fulfil the migration requirements of the big brand owners, which may exceed the legal requirements in the number and amount of residual monomers permitted.

Low migration inks and coatings can be provided by reducing or removing any small (meth)acrylates monomers present, which should preferably be achieved without compromising other properties, such as print performance and adhesion.

While using higher molecular weight materials can provide inks that provide cured products with a reduced amount of migratable species, such materials usually exhibit higher viscosity. High viscosity materials are more difficult to handle in ink production (during mixing and milling) and cause the ink into which they are incorporated to have a very high viscosity and tack, which can cause printing problems.

Printing issues associated with high viscosity and tack include picking, where strong adhesive force (tack) rip fibers off a paper substrate. High tack can also lead to ink piling, where the ink builds on areas of the rollers, blankets, and printing plates over time during a print run.

Providing inks of acceptable viscosity and yield value (the ratio of viscosity at low and high shear rate) is of crucial importance to ensure the ink feeds from an ink duct. Inks having a high viscosity at a low shear rate have a lot of "structure" and "body" and therefore often show a lower tendency to flow, which means it can be difficult to get the ink to flow out of the ink duct without agitation. With high viscosity inks, the printing plate wear can be excessive, so that fine lines and dots can disappear over time on the prints.

WO2017/182638A1 discloses a low migration ink. Although the ink disclosed passes a 10-day migration test at 40° C., the test for assessing compliance with the actual and future standards for migration is a performed at 60° C. in ethanol (see, EU Plastics Directive). At 60° C., substrates such as polyolefin films expand considerably, such that uncured, small acrylate molecules can easily migrate through the film and result in contamination. This is especially problematic for films exhibiting poor barrier properties, such as polyethylene and polypropylene.

The first objective of the present invention is to provide an EB curable ink or coating, as well as a laminate comprising the same, for use in sensitive applications, such as food packaging and pharmaceutical packaging. The inks and coatings of the invention desirably pass the migration test at 60° C. and show no or very low residual migratable species in a total extraction test. The inks and coatings of the invention can be lithographic inks, which exhibit good lithographic performance and give good adhesion to plastic substrates for both surface prints and laminates. It is also desirable that the inks and coatings of the present invention have an acceptable viscosity.

Product sustainability plays an important role and society welcomes new products that are based on renewable feedstock, rather than petroleum-sourced raw materials. Thus, a secondary objective of the present invention, in addition to providing inks and coatings that afford cure products with a low risk of migration, is to provide an EB curable ink, preferably an offset ink, with increased bio-renewable carbon content.

A further objective of the present invention, in addition to providing an ink that affords cured products having a low risk of migration, is to provide an ink or coating that does not suffer from the abovementioned deficits associated with having an increased viscosity. The inks and coatings of the invention achieve a balance between incorporating higher molecular weight monomeric species into the compositions and providing compositions with suitable viscosity. In particular, selecting higher molecular weight materials having moderate viscosity was found to provide EB curable inks with viscosities suitable for offset printing.

SUMMARY OF THE INVENTION

The aforementioned problems of the art have been solved by providing an EB curable ink or coating suitable for offset printing comprising the following materials:
- a) ≤5 wt % of trifunctional monomers having a molecular weight <500 Daltons;
- b) ≤15 wt % of the sum of tri-, tetra-, peta-, hexa-functional or higher functional monomers having molecular weight <500 Daltons;
- c) ≥20 wt % of an acrylated, epoxidized vegetable oil;
- d) ≥5 wt % of an acrylated polyurethane; and
- e) ≥0.3 wt % of a non-acrylated resin.

The ink or coating of the invention may comprise less than 15 wt % of the sum of any tri-, tetra-, penta-, hexa- and higher functional monomers, such as between 1 and 15 wt % of the sum of any tri-, tetra-, penta-, hexa- and higher functional monomers.

The ink or coatings of the invention may optionally comprise one or more colorants.

The present invention further provides a method of making the inks and coatings of the invention as well as a method of printing the inks and coatings of the invention and use of the inks or coatings of the invention in a method of printing.

DETAILED DESCRIPTION

Unless stated otherwise, amounts are given throughout as % by weight of the total inks. Molecular weight of monomers with defined structures can be calculated from their structural formula. Molecular weight of oligomers and polymers can be measured by size exclusion chromatography, using the method defined in the examples.

(Meth)acrylate refers to both acrylates and methacrylates. (Meth)acrylamide refers to both acrylamides and methacrylamides.

Unless otherwise stated, wt % refers to the mass of a particular component relative to the total mass of all components in the composition.

The low migration EB curable inks of the present invention comprising bio-renewable content are preferably applied by offset printing. The offset inks preferably provide good lithographic performance and pass the migration test for acrylates performed at 60° C. for 10 days. The inks and coatings of the invention are suitable for flexible packaging used for sensitive applications, such as food packaging and pharmaceutical packaging. The low migration, EB-curable inks preferably contain a bio-renewable content of ≥10%, and more preferably ≥20%, for example between 20 and 40%. Bio-renewable content is determined using the method provided in the Examples.

The present invention further relates to printed matter and laminates suitable for sensitive packaging applications, comprising the low migration EB-curable inks and coatings of the invention.

The inventive inks and coatings follow two main principles to reduce the risk of migration in EB-curable ink formulations:

1) High (meth)acrylate functionality: the probability is increased that at least one (meth)acrylate group reacts, making the monomer immobile as it forms part of the polymerized binder network.
2) High molecular weight of monomers and oligomers: the tendency to migrate is reduced with increasing molecular weight.

As a general rule, monomers for use in the present invention having low molecular weight (i.e. less than 500 Da) preferably have higher functionality (i.e. at least tri-functional) to compensate for the higher probability of migration (due to the lower molecular weight) with a higher probability of finding a reaction partner and becoming immobile (due to the higher functionality). Monomers with a combination of high functionality and high molecular weight are preferred. Low molecular weight monomers, for example having molecular weight <500 Daltons, having a low acrylate functionality of <3 are less preferred and their use in the inks and coatings of the invention should be minimized or avoided.

In addition to selecting monomers (as defined by claim 1) that provide the inventive EB-offset inks and coatings that pass the regulation requirements for migratable species, it is also desirable to select monomers that fulfill other requirements, such as good printability when used in a lithographic print process on plastic film; good adhesion on various plastic films; and good lamination bond strength in the laminated packaging materials.

The electron-beam curable ink or coating compositions of the invention preferably comprise:
- a) ≤5 wt % of tri-functional monomers having a molecular weight <500 Daltons;
- b) 1 to 15 wt % of the sum of tri-, tetra-, penta-, hexa- and higher functional monomers, wherein all tri-, tetra-, penta-, hexa- and higher functional monomers have a molecular weight above 500 Da;
- c) ≥20 wt % of an acrylated, epoxidized vegetable oil;
- d) ≥5 wt % of an acrylated polyurethane;
- e) ≥0.3 wt % of a non-acrylated resin;

and wherein the composition comprises 10-50% bio-renewable content, such as 20-40%, or 25-35% bio-renewable content, as determined by carbon-C14 analysis.

Monomers (Meth)acrylic (i.e. (meth)acrylate) monomers for use in the present invention preferably include esters of acrylic acid or methacrylic acid with a defined structure. A functionality ≥3 and a molecular weight of >500 Daltons is preferred.

A non-limiting list of examples of (meth)acrylate monomers and oligomers suitable for use in this invention include alkyoxylated monomers, such as ethoxylated trimethylolpropane triacrylates, propoxylated trimethylolpropane triacrylates, ethoxylated glycerol triacrylates, propoxylated glycerol triacrylates, propoxylated diglycerol tetraacrylates, ethoxylated pentaerythritol triacrylates, propoxylated pentaerythritol triacrylates, ethoxylated pentaerythritol tetraacrylates, propoxylated pentaerythritol tetraacrylates, ethoxylated pentaerythritol tetraacrylates, propoxylated pentaerythritol tetraacrylates, ethoxylated dipentaerythritol hexaacrylates, ditrimethylolpropane, propoxylated dipentaerythritol hexaacrylates, ditrimethylolpropane tetraacrylate, dipentaerythritol pentaacrylate, pentaerythritol hexaacrylate, dipentaerythritol hexaacrylate or mixtures thereof. Preferred are higher ethoxylated and propoxylated tri-, tetra-, penta- and hexaacrylate monomers. The (meth)acrylate equivalents of the above are also suitable for use with the invention.

The degree of ethoxylation and propoxylation is preferably such that the molecular weight of the monomers exceeds 500 Daltons. Propoxylation is preferred over ethoxylation, as this makes the ink less hydrophilic and avoids over-emulsification with a fountain solution. The bio-renewable content of the ink can be provided by such monomers, which can be based on glycerol. Another example is propoxylated glycerol triacrylate. In general, with monomers, viscosity and cure speed can be adjusted.

The inks and coatings of the invention comprise 5 wt % or less of trifunctional monomers having a molecular weight of less than 500 Da. The inks and coatings of the invention preferably comprise 4 wt % or less of trifunctional monomers having a molecular weight of less than 500 Da, such as more preferably 3 wt % or less, or 2 wt % of less of trifunctional monomers having a molecular weight of less than 500 Da. The inks and coatings of the invention may preferably comprise between 1 and 5 wt % of trifunctional monomers having a molecular weight of less than 500 Da.

The inks or coatings of the invention may comprise less than 40 wt %, such as less preferably than 30 wt %, or less than 20 wt % of the sum of trifunctional, tetrafunctional, pentafunctional, hexafunctional, or higher functional monomers. The inks or coatings of the invention comprise may comprise between 1 and 40 wt %, such as between 1 and 30 wt %, or 1 and 20 wt % of the sum of trifunctional, tetrafunctional, pentafunctional, hexafunctional, or higher functional monomers.

The inks or coatings of the invention comprise less than 15 wt % of the sum of trifunctional, tetrafunctional, pentafunctional, hexafunctional, or higher functional monomers having a molecular weight below 500 Da. The inks or coatings of the invention may comprise between 1 and 15 wt % of the sum of trifunctional, tetrafunctional, pentafunctional, hexafunctional, or higher functional monomers having a molecular weight below 500 Da The inks or coatings of the invention may preferably comprise less than 15 wt % of the sum of any trifunctional, tetrafunctional, pentafunctional, hexafunctional, or higher functional monomer. The inks or coatings of the invention more preferably comprise between 1 and 15 wt % of the sum of any trifunctional and higher functional monomer, such as between 3 and 15 wt %, such as 6 and 14 wt %, or between 6 and 13 wt %, or even more preferably between 8 and 14 wt %, such as between 8 and 13 wt %, or between 10 and 13 wt % of the sum of any trifunctional and higher functional monomer.

The inks or coatings of the invention may preferably comprise less than 15 wt % of the sum of trifunctional, tetrafunctional, pentafunctional, or hexafunctional monomers. The inks or coatings of the invention may preferably comprise between 1 and 15 wt % of trifunctional and higher functional monomers, such as between 3 and 20 wt % of trifunctional, tetrafunctional, pentafunctional, or hexafunctional monomers, such as between 3 and 15 wt %, or preferably between 6 and 14 wt %, or between 6 and 13 wt %, or more preferably between 8 and 14 wt %, or between 8 and 13 wt %, or between 10 and 13 wt % of trifunctional, tetrafunctional, pentafunctional, or hexafunctional monomers.

The inks and coatings of the invention comprise 5 wt % or less of the sum of monofunctional, difunctional, and trifunctional monomers having a molecular weight of less than 500 Da. The inks and coatings of the invention preferably comprise 4 wt % or less of the sum of monofunctional, difunctional, and trifunctional monomers having a molecular weight of less than 500 Da, such as more preferably 3 wt % or less, or 2 wt % or less of the sum of monofunctional, difunctional, and trifunctional monomers having a molecular weight of less than 500 Da. The inks or coatings of the invention may be free of free of monofunctional, difunctional, and trifunctional monomers having a molecular weight above 500 Da, i.e. only comprise monofunctional, difunctional, and trifunctional monomers having a molecular weight above 500 Da.

The inks or coatings of the invention may preferably comprise 2 wt % of less of the sum of monofunctional and difunctional monomers having a molecular weight of less than 500 Da or more preferably may be free of monofunctional and difunctional monomers having a molecular weight of less than 500 Da (i.e. only comprises monofunctional and difunctional monomers having a molecular weight above 500 Da). The inks or coatings of the invention may preferably comprise 2 wt % or less of the sum of all monofunctional and difunctional monomers or may more preferably be free of monofunctional and difunctional monomers.

Acrylated Epoxidized Vegetable Oils

Acrylated epoxidized vegetable oils suitable for use in the invention can be based on linseed oil, soybean oil, castor oil, China wood oil and mixtures thereof, having a molecular weight of >1000 Daltons. Preferred is an acrylated, epoxidized, soybean oil having an average acrylate functionality of ≥3 and a number average molecular weight of >1000 Daltons. The acrylated epoxidized vegetable oil, through its limited functionality at higher molecular weight, imparts flexibility to the ink, which favors ink adhesion to non-porous substrates. Moreover, acrylated epoxidized vegetable oils contribute to pigment wetting and good lithographic performance in the offset printing process.

Bio-renewable content of the inks and coatings of the invention is provided by the unsaturated vegetable oils on which the acrylated epoxidized vegetable oils are based, including soybean oil, linseed oil, castor oil and the like. One example is Laromer EA9101 from BASF.

The inks or coatings of the invention comprise 20 wt % or greater of acrylated, epoxidized vegetable oils. The inks or coatings of the invention preferably comprise between 20 and 80 wt % of acrylated, epoxidized vegetable oils, such as between 20 and 60 wt %, or between 20 and 40%, or between 22 and 38 wt %, or more preferably between 24 and 38 wt %, such as between 25 and 35 wt % of acrylated, epoxidized vegetable oils.

Acrylated Polyurethane

The ink and coatings of the present invention comprise an acrylated polyurethane, which make the inks and coatings of the invention particularly suitable for printing on non-porous substrates. This is because the urethane groups can form strong hydrogen bonds, as well as additional interactions, with chemical groups on the surface of the polymeric substrate, such as corona-treated plastic substrates, which contributes to ink adhesion. It is advantageous to have a mixture of 2-3 different polyurethanes to optimize adhesion to plastic foils, such as corona treated polyolefins and PET.

Polyurethanes, which contain bio-renewable content are commercially available. One example is Genomer 4293 from Rahn Group.

The inks or coatings of the invention comprise 5 wt % or greater of an acrylated polyurethane. The inks or coatings of the invention preferably comprise between 5 and 50 wt % of acrylated polyurethane, such as between 5 and 40 wt %, or between 5 and 30%, or more preferably between 10 and 30 wt %, such as between 10 and 25 wt %, or between 13 and 23 wt % of acrylated polyurethane.

Acrylated Polyester

Acrylated polyesters suitable for use in the present invention include acrylated oligomers preferably with a number average molecular weight of about 1,000-5,000 Daltons and an acrylate functionality >2. Acrylated polyesters contribute to EB-curing, gloss and mechanical properties of the hardened film.

Acylated polyesters containing bio-renewable content can be used in the inks of the invention, including those based on fatty acid derivatives, such as oleic acid and its dimers and trimers, polyols, and acrylic acid. Such materials are available under the brand name Ebecryl 10801 from Allnex company, for example.

The inks or coatings of the invention may comprise 00 wt % or less of acrylated polyester. The inks or coatings of the invention may comprise between 1 and 10 wt % of acrylated polyester, such as between 2 and 8 wt %, or between 3 and 7%, or between 4 wt % and 6 wt % of acrylated polyester.

Inert (Non-Acrylated) Resins

Inert (non-acrylated) resins suitable for use in the inks and coatings of the invention are soluble in acrylic monomers and have a number average molecular weight of 1,000-100,000 Daltons, preferably between 1,000-25,000 Daltons. The term "inert resins" refers to resins that have no polymerizable acrylic groups. They can derive, for example, from rosin resins, hydrocarbon resins, polyester resin, polyketones, polyurethanes, aldehyde resins, urea resins and epoxy resins.

Inert resins containing bio-renewable content can be used in the inks of the invention, including those based on rosin resin derivatives, such as maleic, fumaric, and phenolic esters of gum rosin and the like, which are extensively used in conventional offset inks. Other such resins include resins based on cellulose derivatives, such as cellulose acetate butyrate, and acrylate-soluble, molecular weight-degraded polylactic acid (PLA). Molecular weight degraded PLA can be produced by depolymerizing insoluble, high molecular weight PLA, for example by thermal treatment in the presence of polyols, to afford a lower molecular weight, soluble product.

The inks or coatings of the invention comprise 0.3 wt % or greater of non-acrylated (i.e. inert) resin. The inks or coatings of the invention preferably comprise between 0.3 and 5 wt % of non-acrylated (i.e. inert) resin, such as between 0.3 and 3 wt %, or between 0.3 and 2%, or more preferably between 0.3 and 1 wt %, or between 0.3 and 0.8 wt %, or between 0.4 and 0.8 wt % of non-acrylated (i.e. inert) resin.

Colorants

The inks of the present invention may also contain one or more colorants in the form of a dye or pigment dispersed therein. Pigments suitable for use in the present invention include conventional organic or inorganic pigments. Representative pigments may, for example, be selected from the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, Pigment Black 7, titanium dioxide in its anatase or rutile modification, zinc oxide, barium sulfate, zinc sulfide, lithopone or calcium carbonate.

The pigments for use in the invention can contribute to the bio-renewable content of the inks and coatings, as the pigment coating can be based on rosin derivatives, such as resinates, or colophony modified with calcium or strontium.

Additives

The inks and coatings of the present invention may further comprise additives to modify the ink and coating properties including surface tension, gloss, flow, pigment wetting and abrasion resistance. Such additives include surface-active agents such as waxes, leveling agents, shelf-life stabilizers, wetting agents, slip agents, flow agents, dispersants, de-aerators, and combinations thereof and the like.

The inks and coatings of the present invention may further comprise extenders, such as clay, talc, calcium carbonate, magnesium carbonate, or silica, in order to adjust water uptake, misting, and/or color strength.

The inks and coatings of the present invention may further comprise a stabilizer (i.e. a polymerization inhibitor) to ensure good shelf-life. Examples of polymerization inhibitors suitable for use in the invention include nitroso-based stabilizers such as nitroso-phenylhydroxylamine, phenolic stabilizers such as hydroquinone (HQ), methylether hydroquinone (MEHQ), butylhydroxytoluene (BHT), and 2,6-di-tert-butyl-N,N-dimethylamino-p-cresol. Other suitable stabilizers include phenothiazine and nitroso-phenylhydroxylamine stabilizers, and stabilizers based on copper and zinc dithiocarbamates.

The additives for use in the invention are preferably present in the inks and coatings of the present invention in amounts of no more than about 15%, such as between 1 and 15 wt %, and more preferably no more than about 12% of the inks or coatings, such as between 1 and 12 wt %.

Substrates

The invention further provides a substrate coated with a cured ink or coating composition according to the invention, to afford a printed article or laminate. The substrate to be printed may be composed of any typical substrate material, including paper, plastic, metal and/or composite. The preferred substrate for use in the invention (i.e. the printed matter and/or laminate) is a plastic film based on, for example, polyethylene, polypropylene, biaxially oriented polypropylene, cast polypropylene, polyethylene terephthalate (PET), biaxially oriented PET, polyamide, polystyrene, and bio-based films and foils derived from polylactic acid, as used for packaging material and food-packaging material. The materials may be coated, for example, by an acrylic coating or a polyurethane coating, or may be chemically surface treated, corona surface treated, plasma surface treated, flame-treated metallized, or neat (i.e. uncoated/untreated).

The surface energy of the plastic film should be sufficient to obtain proper adhesion and printability, otherwise the ink or coating will not wet the surface, causing print and adhesion defects. Sufficient surface energy is usually achieved by corona pre-treatment or flame treatment of the surface of the substrate prior to application of the ink or coating. These processes generate reactive functional groups, such as hydroxy and carbonyl groups, on the surface of the substrate, increasing surface energy. Uncoated substrates often need corona treatment to achieve the right level of surface tension to get proper wetting of the inks to the substrate. Usually, a surface tension of 38-42 dynes/cm or higher is sufficient to provide good wetting of the inks and coatings of the invention on the plastic surface.

EB Curable Offset Inks and Coatings

The inks and coatings of the present invention can be made by methods known in the art, e.g. by mixing, grinding on a three-roll mill or bead mill. Typically, the inks and coatings of the present invention have a viscosity of about 5-120 Pas when measured at a shear rate of D=50 l/s at 23° C. More preferably, the inks or coatings of the invention have a viscosity of about 30-70 Pa·s. The viscosity is measured with cone & plate rheometer at 23° C. and at a shear rate of D=50 l/s.

As previously stated, the molecular weight and acrylate functionality of the monomers for use in the inks and coatings of the invention are preferably as high as possible, while providing a suitable viscosity range for good offset printability.

The tack value of the inks of the inks and coatings of the invention can be varied depending on the nature of the substrate to be printed/coated. Tack values are more critical for paper substrates and less critical for impervious substrates, such as polymer films. Typical tack values for the ink or coating of the invention are between 150-300 units, as measured on a Tack-o-scope (IGT company) at 150 rpm and 30° C. Typical flow values are 4-15 cm on a vertical aluminum plate within 15 minutes.

Application of the inks and coatings of the present invention is preferably carried out by lithographic (offset) print stations, on a web-based printing machine. Optionally, the last printing station can also be a flexographic print station to apply a last down flexographic white ink or a transparent overprint varnish (i.e. wherein the flexographic white ink or transparent overprint varnish is applied to the substrate as the final layer).

There are two preferred methods of application of the inks of the present invention:

a) as a surface print, optionally over the top of a backing white ink, followed by the colors from dark (black) to light (yellow). The surface print can then optionally be overprinted by a transparent protective coating, if necessary (see, Example 3);

b) by reverse printing, where the colors are printed from dark (black) to fair (yellow), followed a backing white as the final layer. The printed layers are then laminated with a protective foil (see, Example 4). The inks can be printed with a web-offset press equipped with an EB-dryer at the end, wherein the print stations can be in row or around a central impression cylinder.

Bio-Renewable Content:

As previously stated, the EB curable inks and coatings of the invention may comprise a higher amount of bio-renewable content (BRC) than is typically known in the art. Usually, the BRC content of UV or EB-inks of the art is less than 10%, as measured with the C-14 carbon method. The BRC refers to the percentage of carbon derived from renewable feedstock relative to the total carbon content in the composition.

A high amount of bio-renewable content can be achieved by incorporating into the inks or coatings of the invention energy-curable raw materials based on renewable feedstock. Such materials include acrylated epoxidized vegetable oils (BRC ~60-80%); acrylated oligomers based on fatty acids (BRC ~30-40%); and vegetable oils and monomers based on glycerol (BRC ~10-20%). Also, pigments may contribute to the BRC of an ink, as the pigment coating can be based on rosin derivatives. Moreover, additional non-acrylated materials can be used to increase the BRC, such as rosin derivatives (BRC ~60-85%); cellulose derivatives, such as cellulose acetate butyrate and polylactic acid (BRC ~95%). These raw materials are preferably incorporated into the inks and coatings of the invention.

The EB curable inks and coatings of the invention preferably have a BRC (percentage of biobased carbon) of 10-50%, such as 20-40%, and more preferably 25-35%.

The BRC can be calculated by taking the percentage of renewable feedstock of each raw material used in the inks. Thus, the percentage of bio-renewable content of a material=molecular weight of the natural fragment divided by the total molecular weight, times 100.

The carbon-14 method can be used to calculate the BRC of both the individual components and final ink and coating composition. The carbon-14 method accurately measures the content of carbon from renewable sources, such as plants. This test is performed according to international standards ASTM D6866 and ISO 16620-2. By measuring the carbon-14 content, ASTM D6866 is able to distinguish between contemporary carbon sources like biomass (biobased carbon) and carbon from petroleum derivatives. Biomass has a known content of carbon-14, whereas petroleum-derived materials do not contain any. For the inks and coatings of the invention, carbon-14 measurements were determined using ASTM D6866-18 Method B (AMS).

EB Curing

The inks and coatings of the present invention can be cured by EB. In an EB-dryer, electrons are accelerated in an electrical field and exit the dryer through a thin metallic foil. Subsequently, the electrons penetrate the acrylic ink or coating and initiate a radical or ionic polymerization, which leads to instant drying (i.e. curing). Commercial EB-dryers are available, for example from Energy Science, Inc. of Wilmington, Mass., or from the Comet company of Switzerland. The energy absorbed, also known as the dose, is measured in units of kilo Grays (kGy). Usually, the EB dose should be within the range of 10 kGy to about 40 kGy, for complete curing. For the radiation curable inks of the present invention, a radiation dose of 20-30 kGy at an oxygen level of <200 ppm is usually sufficient to obtain a dry, solvent-resistant film. An acceleration voltage of 70-200 keV can be applied, and usually 70-120 keV is sufficient to provide a good through-cure of the offset inks, when applied at coating weights of 1-4 g/m$^2$.

Preferably, the EB-curable inks and coatings of the invention are printed wet-on-wet and cured by EB in a single curing step at the end.

As previously described, EB curing technology is especially suitable for sensitive packaging applications, as the higher conversion of the double-bonds compared to UV-curing gives lower levels of residual migrating monomers. Combined with the total absence of photoinitiators, this makes this technology particularly suitable for sensitive applications, such as food-packaging.

The inks and coatings of the invention are suitable for offset printing, including web-offset.

Adhesives and Laminates:

When forming a packaging laminate, in which the ink layer is protected by packaging films from both sides, one packaging film is fixed with an adhesive. Packaging substrates can be formed from various materials including paper, polymeric films such as polyolefins, PET, polyamides, and metallic films such as aluminum foil. Laminates can also comprise several layers, for example, to achieve barrier properties, a non-polar water-repelling layer can be introduced to reduce water vapor penetration, in addition a polar layer can be introduced to minimize oxygen penetration.

Known in the art are poly(isocyanate) adhesives, which cure by reaction with a polyol hardener. These adhesive systems can be solvent-free or can contain a solvent, usually ethyl acetate, and can be used to make adhesive or laminates comprising a cured layer of the ink or coating of the invention.

Suitable adhesives for use with the invention include those based on, for example, monomeric or oligomeric isocyanates, or isocyanate prepolymers, such as those containing or deriving from isophorone diisocyanate (IPDI), toluene diisocyanate (TDI), its di- and trimers (isocyanurates), as well as oligomeric isocyanates based on polyols, IPDI, TDI, or polyurethanes-polyether polyols or polyurethane polyester-polyols end-capped with isocyanates.

The hardeners are monomeric or oligomeric polyols such trimethylol propane, pentaerythritol, castor oil, polypropylene glycols, and polyester glycols.

Before application, the adhesives are typically applied by a laminator in film weights of ~2-3 g/m² for solvent-free adhesive, and 3-4 g/m² for solvent-containing adhesive. After application, the laminates are dried at room temperature or elevated temperature (e.g. 30-80° C.). The strength of a laminate is determined from the lamination bond strength, which is measured by a peel-tear tester that measures the force needed to tear apart the two outside films. With the inks or coatings of this invention, a good adhesion can be achieved between the ink layer and the substrate to be printed on. Laminates are widely used, for example, for food packaging of fatty, dry food, such as nuts, or water-containing liquid food.

Migration:

There are two principal ways in which foodstuffs can be contaminated: (a) by migration of small acrylate molecules through a substrate and (b) by set-off migration. Set-off migration (b) occurs when printed matter is stacked or reeled prior to being filled with food, wherein the ink layer on the surface intended to form the outside of the packaging comes into contact with the surface intended to form the food-contacting surface of the packaging. The ink can thus migrate onto the food-contacting surface and contaminate the foodstuffs, especially if the surface of the ink is poorly cured.

Through migration (a) can occur when, for example, a plastic film exhibits poor barrier properties, such as those derived from polyethylene. Through migration is especially problematic at higher temperatures, such as 60° C., where the film expands, and small molecules can more easily migrate through the polymer chains.

Even though there are no universally agreed regulations on the migration limit for indirect food contact, there are some guidelines and recommendations, for example as provided by the Association of European Printing ink Manufactures (EUPIA). EUPIA also provides guidelines on how to calculate the potential maximum level of migratable species arising from printed matter. Such specific migration limits are also given for example in the Swiss Ordinance Annex 10 of the Federal Department of Home Affairs from May 1, 2017 on materials and articles intended to come into contact with foodstuffs, or the EU plastics directive. To be compliant, the specific migration limits (SML) for the acrylates and other listed materials as stated in these doctrines should not be exceeded. For example, for those acrylates which are not fully tested and where no SML is available, the migration limit is as low as 10 part per billion (ppb). The inks of the present invention comply with the specific migration limits for (meth)acrylates and in particular those for acrylates. The Swiss Ordinance Annex 10 provides the following limits: PPTTA: 50 ppb, DPHA: 10 ppb, EO(3)TMPTA 50 ppb, GPTA 50 ppb, EO(9)TMPTA: 10 ppb. Methacrylates are considered less hazardous. For example, they are found in medical products, such as dental repair kits.

Migration Analysis:

To determine the extent of migration from packaging materials into food, food simulants are used, not actual foodstuffs. Food simulants are better, due to the simplification of chemical analysis of the migrants. Food simulants vary in terms of their chemical properties, thus representing several different food types: hydrophilic (water-based); lipophilic (fatty foods); and foods with both hydrophilic and hydrophobic properties. For example, migration into an oily food is measured with the food simulant vegetable oil. Food simulants such as aqueous ethanol or diluted acetic acid are used for water-based foods and drinks. Dry foods are simulated by a synthetic polymer with defined pore size, for example, Tenax 0 (poly (2,6-diphenyl-p-phenylene oxide).

For the migration test, the food contact side of a print or laminate is brought into contact with a food simulant for a certain time at a certain temperature. A typical contact condition is 10 days at 60° C. with Tenax or 95% ethanol. Subsequently, a defined amount of food simulant is extracted with a defined amount of solvent and the solvent is concentrated and analyzed, usually by high performance liquid chromatography (HPLC). The amount of migratable species (acrylates) is then determined quantitatively with help of a calibration curve of the pure acrylate monomers. Usually, a migration test in ethanol is regarded as the more severe test and thus more difficult to pass.

In the present application migration was performed according to EN 1186 Materials and articles in contact with foodstuffs—Plastics, May 2002. If the detected amounts of migrants do not exceed the specific migration limits given in the Commission Regulation (EU) No 10/2011 and the Swiss Regulation Annex on Food Contact Materials, the printed matter is regarded as compliant.

Total Extraction Analysis:

A total extraction test has also been performed to document the very low risk of migration of the inks and coatings of the present invention, even under more severe conditions. Here, a liquid food simulant is brought directly in contact with the ink layer and migratable species are extracted from the ink directly at elevated temperature. This test is much more severe than the migration test and detects any uncured material in the ink. As described in Example 5, the inks of this invention performed quite well with very low amounts of residual acrylate migrants detected, i.e. below the specific migration limits.

Collectively, the inventive EB curable (offset) inks and coatings of the invention combine a low risk of migration and a high level of bio-renewable content, making them especially suitable for use as an energy-curable, sustainable product for food packaging applications.

The invention is further described by the following numbered paragraphs:

1. An electron-beam curable ink or coating composition, comprising;
   ≤2% of a tri-functional monomer having a molecular weight <500 Da;
   ≤15% sum of a tri-, tetra-, peta-, hexa- or higher functional monomer;
   ≥20% of an acrylated, epoxidized vegetable oil;
   ≥5% of an acrylated polyurethane; and
   ≥0.3% of a non-acrylated resin.
2. The composition of paragraph 1, wherein the materials have the following molecular weights:
   tri-functional monomer having a molecular weight <500 Daltons;
   sum of a tri-, tetra-, peta-, hexa- or higher functional monomer having a molecular weight >500 Daltons;
   acrylated, epoxidized vegetable oil having a molecular weight >1000 Daltons;
   acrylated polyurethane having a molecular weight of >1000 Daltons;
   non-acrylated resin having a molecular weight of >1000 Daltons.
3. The composition of paragraph 1 or 2, wherein the composition is an offset ink or coating.
4. The composition of any preceding paragraph, further comprising one or more colorants.
5. The composition of paragraph 4, wherein at least a portion of the colorants comprise pigments can containing bio-renewable content.
6. The composition of any preceding paragraph, wherein the acrylate monomers and oligomers are selected from the group consisting of alkyoxylated monomers, such as ethoxylated trimethylolpropane triacrylates; propoxylated trimethylolpropane triacrylates; ethoxylated glycerol triacrylates; propoxylated glycerol triacrylates; propoxylated diglycerol tetraacrylates; ethoxylated pentaerythritol triacrylates; propoxylated pentaerythritol triacrylates; ethoxylated pentaerythritol tetraacrylates; propoxylated pentaerythritol tetraacrylates; ethoxylated pentaerythritol tetraacrylates; propoxylated pentaerythritol tetraacrylates; ethoxylated dipentaerythritol hexaacrylates; ditrimethylolpropane; propoxylated dipentaerythritol hexaacrylates; ditrimethylolpropane tetraacrylate; dipentaerythritol pentaacrylate; pentaerythritol hexaacrylate; dipentaerythritol hexaacrylate or mixtures thereof.
7. The composition of any preceding paragraph, comprising an acrylated epoxidized vegetable oil selected from the group consisting of linseed oil; soybean oil; castor oil; China wood oil and mixtures thereof
8. The composition of any preceding paragraph, comprising a polyurethane which contain bio-renewable content.
9. The composition of any preceding paragraph, comprising an acrylated polyester with bio-renewable content derived from fatty acid derivatives
10. The composition of any preceding paragraph, wherein the acrylated polyester with bio-renewable content is derived from the group consisting of oleic acid and its dimers and trimers; polyols; acrylic acid and combinations thereof.
11. The composition of any preceding paragraph, further comprising an inert resin soluble in acrylic monomers.
12. The composition of paragraph 10, wherein the inert resin is selected from the group consisting of rosin resins, hydrocarbon resins, rosin resins polyester resin, polyketones, polyurethanes, aldehyde resins, urea resins, epoxy resins and combinations thereof.
13. The composition of paragraph 10, wherein the inert resin comprises bio-renewable content selected from the group consisting of rosin derivatives, such as maleic, fumaric, phenolic esters, gum rosin; and resins based on cellulose derivatives, such as cellulose acetate butyrate and acrylate soluble, molecular weight degraded polylactic acid, and combinations thereof.
14. The composition of any preceding paragraph, further comprising one or more additives selected from the group consisting of surfactants, waxes, leveling agents, shelf-life stabilizers, wetting agents, slip agents, flow agents, dispersants and de-aerators.
15. The composition of any preceding paragraph, further comprising one or more extenders selected from the group consisting of clay, talc, calcium carbonate, magnesium carbonate, silica and combinations thereof.
16. The composition of any preceding paragraph, comprising 10-50% bio-renewable content determined by carbon-C14 analysis.
17. The composition of any preceding paragraph, comprising 20-40% bio-renewable content determined by carbon-C14 analysis.
18. The composition of any preceding paragraph, comprising 25-35% bio-renewable content determined by carbon-C14 analysis.
19. A printed article comprising an ink according to any one or more of paragraphs 1-18 and a substrate.
20. A laminate, comprising an ink according to any one or more of paragraphs 1-18, a substrate, an adhesive and a sealing substrate.
21. The printed matter or laminate, according to paragraph 19 or 20, which complies with the specific migration levels for acrylates given in the Swiss Ordinance Annex 10 of the Federal Department of Home Affairs on materials and articles intended to come into contact with foodstuffs from May 1, 2017, measured in a migration test at 60° C. for 10 days in ethanol.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted, to limit the scope of the invention.

Test Methods

Molecular Weight:

The molecular weight of non-polymeric or oligomeric compounds (i.e. defined monomeric species) is defined and calculated by the molecular structure of the compound. Usually, this is given by the supplier technical data sheet of the monomer or can be found on the webpage of the European Chemical Agency (ECHA).

Oligomeric and polymeric species typically comprise a distribution of chain lengths and thus a distribution of molecular weights. Accordingly, the molecular weight of oligomeric and polymeric species (as well as components existing as a mixture of species with individual molecular weights above 500 Da (and thus having a distribution—e.g. vegetable oils) is measured by Gel Permeation Chromatography (GPC) conducted on a Hewlett-Packard 1050 Series HPLC system equipped with two GPC Ultrastyragel columns, 103 and 104 Å (5 µm mixed, 300 mm×19 mm, Waters Millipore Corporation, Milford, MA, USA) and THF as mobile phase. The molecular weight is calculated by comparison with a polystyrene standard. The skilled person will appreciate that this definition of molecular weight applies to polymeric materials which typically have a molecular weight distribution. Unless otherwise stated, the molecular weight reported herein for oligomers and polymers is the number average molecular weight.

Viscosity:

Viscosity was measured with a Physika 300 cone and plate rheometer from Anton Parr GmbH at a shear rate of D=2-100 l/s. The viscosity value at a shear rate of D=50 l/s is recorded (Pa.$). Unless stated otherwise, viscosity was measured at 23° C.

Tack:

Tack is measured with a calibrated "Tack-o-scope" instrument (Model 2001) from IGT Testing Systems, Netherlands. 1 ml of ink is placed on the EPDM rubber distribution roller at 30° C., distributed for 90 seconds at a roller speed of 50 rpm, then 30 seconds at 300 rpm. The tack value is then taken at a roller speed of 150 rpm.

Ink Flow:

Flow is measured with a vertically arranged aluminum plate on which 1 ml of ink is placed. The distance in cm that the ink ran down the plate after 15 minutes is recorded.

Total Extraction Analysis:

Prints (150% ink coverage) on BOPP foil (12 µm) were cut into 50 cm$^2$ and completely immersed in 20 ml of absolute ethanol for 24 hours at 60° C. The solution was then decanted off and concentrated to 1 ml using an automatic evaporator and the resulting concentrate analyzed by GC-MS and HPLC-UV-MS. Each sample was tested in duplicate for reproducibility purposes.

Migration Analysis:

In the present application migration was performed according to EN 1186 Materials and articles in contact with foodstuffs—Plastics, May 2002. Printed laminates having a printed area of 50 cm$^2$, are placed in standard migration cells with the food contact side of the print in contact with 95% ethanol for 10 days at 60°. Afterwards, the cells are emptied, and the solution is concentrated and analyzed by gas-chromatography-mass spectrometry (GC-MS) and Ultra high performance, liquid chromatography—time of flight mass-spectrometry (UHPLC-MS-TOF). The chromatogram was analyzed for substances and the quantification of identified substances was performed via external standards. If the detected amounts of migrants do not exceed the specific migration limits given in the Commission Regulation (EU) No 10/2011 and the Swiss Regulation Annex on Food Contact Materials, the printed matter is regarded as compliant. The Swiss Ordinance Annex 10 provides the following limits: PPTTA: 50 ppb, DPHA: 10 ppb, EO(3)TMPTA 50 ppb, GPTA 50 ppb, EO(9)TMPTA: 10 ppb.

Bio-Renewable Content:

The bio-renewable content is measured using the C-14 carbon method as defined in ASTM D6866-18 Method B (AMS).

Example 1: Inventive Composition of a Cyan EB Curable Offset Ink

| Component | Weight % |
| --- | --- |
| Aliphatic polyurethane acrylate 1: Mw >1000 | 10 |
| Aliphatic polyurethane acrylate 2: Mw >1000 | 10 |
| Acrylated, epoxidized soybean oil: Mw >1000 | 30 |
| Polymerization Inhibitor | 1.5 |
| Trifunctional acrylate monomer, Mw <500 | 2 |
| Hexafunctional acrylate monomer, Mw >500 | 6.5 |
| Flow additive | 1.5 |
| Leveling agent | 0.50 |
| Pigment blue 15:3 | 23 |
| Micronized talc | 3 |
| Clay | 7 |
| Cellulose acetate butyrate varnish* | 5 |
| Total | 100 |
| Viscosity at a shear rate of D = 2 s-1@23° C. | 137 |
| Viscosity at a shear rate of D = 50 s-1@50° C. | 40 |
| Tack (units) | 250 |
| Flow (cm) | 3.5 |

*10% cellulose acetate butyrate polymer dissolved in trifunctional alkoxylated acrylate monomer with a molecular weight >500

Example 2: Inventive Composition of a Cyan EB Curable Ink

| Component | Weight % |
| --- | --- |
| Aliphatic polyurethane acrylate 1: MW >1000 | 6.31 |
| Acrylated polyester resin: Mw >1000 | 4.85 |
| Aliphatic polyurethane acrylate 2: MW >1000 | 9.71 |
| Acrylated, epoxidized soybean oil: MW >1000 | 31.07 |
| Polymerization Inhibitor | 1.46 |
| Hexafunctional acrylate monomer, Mw >500 | 4.85 |
| Flow additive | 1.46 |
| Leveling agent | 0.49 |
| Pigment blue 15:3 | 22.33 |
| Micronized talc | 2.91 |
| Clay | 6.80 |
| Cellulose acetate butyrate varnish* | 4.85 |
| Tetrafunctional monomer, Mw >500 | 1.94 |
| Tack reducer additive | 0.97 |
| Total | 100 |
| Viscosity at a shear rate of D = 2 s-1@23° C. | 109.7 |
| Viscosity at a shear rate of D = 50 s-1@50° C. | 40.8 |
| Tack (units) | 279 |
| Flow (cm) | 4.5 |

*10% cellulose acetate butyrate polymer dissolved in trifunctional alkoxylated acrylate monomer with a molecular weight >500

Example 3: Inventive Composition of a Cyan EB Curable Ink

| Component | Weight % |
| --- | --- |
| Aliphatic polyurethane acrylate 1: MW >1000 | 4.85 |
| Aerylated polyester resin: Mw >1000 | 4.85 |
| Aliphatic polyurethane acrylate 2: MW >1000 | 4.85 |
| Aliphatic polyurethane acrylate 3: MW >1000 | 6.31 |
| Acrylated, epoxidized soybean oil: MW >1000 | 31.07 |
| Polymerization Inhibitor | 1.46 |
| Hexafunctional acrylate monomer, Mw >500 | 4.85 |
| Flow Additive | 1.46 |
| Leveling agent | 0.49 |
| Pigment Blue 15:3 | 22.33 |
| Micronized talc | 2.91 |

| Component | Weight % |
|---|---|
| Clay | 6.80 |
| Cellulose acetate butyrate varnish* | 4.85 |
| Tetrafunctional monomer Mw >500 | 1.94 |
| Tack reducer additive | 0.98 |
| Total | 100 |
| Viscosity at a shear rate of D = 2 s-1@23° C. | 155.7 |
| Viscosity at a shear rate of D = 50 s-1@50° C. | 43.6 |
| Tack (units) | 264 |
| Flow (cm) | 5.3 |

*10% cellulose acetate butyrate polymer dissolved in trifunctional alkoxylated acrylate monomer with a molecular weight >500

Example 4: Comparative Example Experiment (Non-Inventive)

| Component | Weight % |
|---|---|
| Acrylated, epoxidized soybean oil, MW >1000 | 19.11 |
| Polymerization Inhibitor | 0.95 |
| Flow Additive | 1.46 |
| Trifunctional monomer 1, Mw <500 | 5.14 |
| Trifunctional monomer 2, Mw <500 | 14.15 |
| Tetrafunctional monomer, Mw >500 | 8.07 |
| Leveling agent | 0.49 |
| Pigment Blue 15:3 | 25.8 |
| Micronized talc | 3.18 |
| Clay | 6.8 |
| Inert ketone resin Tg ~45° C. | 14.85 |
| Total | 100 |
| Viscosity at a shear rate of D = 2 s-1@23° C. | 141.0 |
| Viscosity at a shear rate of D = 50 s-1@50° C. | 43.5 |
| Tack (units) | 258 |
| Flow (cm) | 3.5 |

*10% cellulose acetate butyrate polymer dissolved in trifunctional alkoxylated acrylate monomer with a molecular weight >500

Total Extraction of Surface Prints of Examples 1-3:

The inks of example 1-3 were applied on a corona treated polypropylene film (Taghleef TSS20) having a thickness of 20 μm and a surface tension of <38 dynes/cm, at a film weight of 1.5 g/m$^2$ by an offset print prover Model C-05 from IGT company. The print was cured in an EB-curing rig from Comet company at a dose rate of 30 kGy with an acceleration voltage of 110 KeV at an oxygen level of 200 ppm.

TABLE 1

Total extraction of the prints was analyzed as described aforementioned (detected monomers in parts per billion ppb):

| Analyte | PPTTA | DPHA | EO(3)TMPTA | GPTA | EO(9)TMPTA |
|---|---|---|---|---|---|
| CAS No: | 51728-26-8 | 29570-58-9 | 28961-43-5 | 52408-84-1 | 28961-43-5 |
| Print of formula of example 1 on BOPP | <10 | <10 | <10 | <10 | <10 |
| Print of formula of example 2 on BOPP | <10 | <10 | <10 | <10 | <10 |
| Print of formula of example 3 on BOPP | <10 | <10 | <10 | <10 | <10 |

BOPP = Bioriented polypropylene (Brand name Taghleef TSS20, 20 μm thickness).

The surface prints did not show any residual monomers, which could pose a risk for migration.

Example 5

Laminates were analyzed having the following structure: oriented polypropylene Taghleef TSS20 (20 μm)/ink of Example 1-3 at an ink coverage of ~150% ink coverage/polyurethane 2-component adhesive/oriented polypropylene (Taghleef TSS20 (20 μm). The food contact side was in contact with the food simulant (ethanol 95%) at 60° C. for 10 days. Then, the food simulant is concentrated and analyzed with liquid chromatography (modified C18 column) and the separated materials are identified with time of flight (TOF) mass spectroscopy vs external acrylate standards.

Migration analysis of laminates made from inventive inks of Examples 1-3 was measured (10 days at 60° C. in ethanol (see above testing methodology)). Detected monomers given in parts per billion ppb:

TABLE 2

Migration analysis

| Analyte | PPTTA | DPHA | EO(3)TMPTA | GPTA | EO(9)TMPTA |
|---|---|---|---|---|---|
| CAS No: | 51728-26-8 | 29570-58-9 | 28961-43-5 | 52408-84-1 | 28961-43-5 |
| SML: Specific migration limit (parts per billion (ppb) | 10 | 10 | 50 | 50 | 50 |
| Laminate with formula of example 1 | n.d | n.d | 7 | 14 | n.d. |
| Laminate with formula of example 2 | n.d | n.d | n.d. | n.d | n.d. |
| Laminate with formula of example 3 | n.d | n.d | 5 | 20 | n.d. |
| Laminate with comparative example 4 | 29 | n.d. | 117 | 63 | n.d. | n.d. = not detected

The laminates of example 1-3 passed the migration test at 60° C. for 10 days, whereas the comparative laminate made with example 4 (higher amount of low molecular weight monomers) exceeded the given specific migration limits (SML) and failed the requirements.

The invention claimed is:

1. An electron-beam curable ink or coating composition, comprising:
   a) <5 wt % of the sum of the monofunctional, difunctional, and tri-functional monomers having a molecular weight <500 Daltons;
   b) 1 to 15 wt % of the sum of the tri-, tetra-, penta-, hexa- and higher functional monomers;
   c) ≥20 wt % of an acrylated, epoxidized vegetable oil;
   d) 5 to 30 wt % of an acrylated polyurethane; and
   e) 0.3 to 3 wt % of a non-acrylated resin; wherein the non-acrylated resin comprises bio-renewable content selected from the group consisting of rosin derivatives; resins based on cellulose derivatives; acrylate-soluble molecular weight degraded polylactic acid; and combinations thereof.

2. The composition of claim 1, comprising <2 wt % of tri-functional monomers having a molecular weight <500 Daltons.

3. The composition of claim 1, comprising ≤2 wt % of the sum of the monofunctional, difunctional, and trifunctional monomers having molecular weight <500 Daltons.

4. The composition of claim 1, comprising 2 wt % or less of the sum of mono and difunctional monomers.

5. The composition of claim 1, wherein:
   i) the tri-, tetra-, penta-, hexa- or higher functional monomers of component b) have molecular weights >500 Daltons;
   ii) the acrylated, epoxidized vegetable oil of component c) has a molecular weight >1000 Daltons;
   iii) the acrylated polyurethane of component d) has a molecular weight of >1000 Daltons; and
   iv) the non-acrylated resin of component e) has a molecular weight of >1000 Daltons.

6. The composition of claim 1, comprising between 22 and 38 wt %, or between 24 and 38 wt % of acrylated, epoxidized vegetable oils.

7. The composition of claim 1, comprising between 10 and 25 wt % of acrylated polyurethane.

8. The composition of claim 1, further comprising an acrylated polyester.

9. The composition of claim 8, wherein the acrylated polyester is present in the composition in an amount between 1 and 10 wt %.

10. The composition of claim 9, wherein the acrylated polyester comprises bio-renewable content derived from fatty acid derivatives.

11. The composition of claim 1, wherein the non-acrylated resin is soluble in acrylic monomers.

12. The composition of claim 11, wherein the non-acrylated resin is selected from the group consisting of rosin resins, cellulose resins, hydrocarbon resins, polyester resin, polyketones, polyurethanes, aldehyde resins, urea resins, epoxy resins and combinations thereof.

13. The composition of claim 1, further comprising one or more colorants.

14. The composition of claim 13, wherein at least a portion of the colorants comprises pigments comprising bio-renewable content.

15. The composition of claim 1, wherein the acrylated epoxidized vegetable oil is selected from the group consisting of linseed oil; soybean oil; castor oil; China wood oil and mixtures thereof.

16. The composition of claim 1, comprising 20-40% bio-renewable content determined by carbon-C14 analysis.

17. The composition of claim 1, comprising a mixture of at least two different acrylated polyurethanes.

18. A printed article comprising an ink or coating composition according to claim 1 and a substrate.

19. The printed article of claim 18, wherein the substrate is selected from the group consisting of paper, plastic, metal and composite.

20. The printed article of claim 19, which is a packaging article.

21. The printed article of claim 20, which complies with the specific migration levels for acrylates given in the Swiss Ordinance Annex 10 of the Federal Department of Home Affairs on materials and articles intended to come into contact with foodstuffs from May 1, 2017, measured in a migration test at 60° C. for 10 days in ethanol.

22. A method of making the ink or coating composition of claim 1, comprising the steps of
   a) providing the components of the ink or coating composition; and
   b) mixing the components together to make the ink or coating composition.

23. A method of printing the ink or coating composition of claim 1, comprising the steps of
   a) providing a substrate; and
   b) printing a layer of the ink or coating composition on the substrate.

24. The method of claim 23, wherein after steps a) and b), the method further comprises step:
   c) curing the layer of the ink or coating composition.

25. The method of claim 24, wherein the curing is performed by electron beam radiation.

26. The method of claim 25, wherein the electron beam dose is between 20 and 30 kGy and an accelerating voltage of between 70 and 200 keV, in an atmosphere with an oxygen level of less than 200 ppm.

27. The composition of claim 4, wherein the composition is free of monofunctional and difunctional monomers.

28. The composition of claim 8, wherein the acrylated polyester is present in the composition in an amount between 2 and 8 wt %.

29. The composition of claim 8, wherein the acrylated polyester is present in the composition in an amount between 3 and 7 wt %.

30. The composition of claim 1, wherein the non-acrylated resin comprises resins based on cellulose derivatives, wherein the cellulose derivative is cellulose acetate butyrate and combinations thereof.

31. The composition of claim 1, comprising between 0.3 and 2 wt % of the non-acrylated resin.

32. The composition of claim 1, comprising between 0.3 and 1 wt % of the non-acrylated resin.

33. An electron-beam curable ink or coating composition, comprising;
   a) 1 to 15 wt % of the sum of the tri-, tetra-, penta-, hexa- and higher functional monomers;
   b) ≥20 wt % of an acrylated, epoxidized vegetable oil;
   c) 5 to 30 wt % of an acrylated polyurethane; and
   d) 0.3 to 3 wt % of a non-acrylated resin; wherein the non-acrylated resin comprises bio-renewable content selected from the group consisting of rosin derivatives; resins based on cellulose derivatives; acrylate-soluble molecular weight degraded polylactic acid; and combinations thereof.

34. The composition of claim 1, wherein the rosin derivatives are selected from the group consisting of maleic gum rosin esters, fumaric gum rosin esters, phenolic gum rosin esters, and combinations thereof.

35. The composition of claim 33, wherein the tri-, tetra-, penta-, hexa- or higher functional monomers of component a) have molecular weights >500 Daltons.

* * * * *